Patented Oct. 6, 1953

2,654,672

UNITED STATES PATENT OFFICE 2,654,672

COMPOSITION FOR MAKING BREAD

Roland W. Selman, Jr., and Boyce G. Carson, Kansas City, Mo., assignors to De-Raef Corporation, Kansas City, Mo., a corporation of Missouri No Drawing. Application March 22, 1951, Serial No. 217,064

3 Claims. (Cl. 99—90)

Our invention relates to a composition for making bread, and more particularly to a composition which will enable soya flour to be used in white bread without deleterious results.

Soya flour is richer in protein than white flour and many attempts have been made to use soya flour in white bread, with indifferent results. When soya flour is used in white bread there is always a discoloration or "creaminess" of the bread crumb. Then, too, we find a weakening of the bread crumb with the use of soya flour. Furthermore, the white bread baked with a mixture of soya flour has a more open grain, a lowered volume and a "beanish"-like aroma. Besides, there is an off-"beanish" taste. In addition white breads made with a mixture of soya flour have an inferior keeping quality and there is always a decrease in mixing tolerances.

One object of our invention is to provide a composition for making bread in which soya flour may be added to the bread to increase the protein content of the bread but which will produce a bread having a high score, taking into consideration crust color, evenness of the bake, symmetry of the loaf, taste, aroma, grain, texture and loaf volume.

Another object of our invention is to provide a composition for making bread which will enable soya flour to be used without producing creaminess of the bread crumb, a weakening thereof, lowered volume, a beanish-like aroma and an off-beanish taste.

Another object of our invention is to provide a composition for making bread employing soya flour and milk solids which will give a bread of high quality.

Our composition in general comprises a major proportion of defatted soya flour and a minor proportion of calcium carbonate together with lesser portions of potassium bromate and monocalcium acid phosphate.

A preferred composition is as follows:

91.00 parts by weight defatted soya flour
.07 part by weight potassium bromate
8.43 parts by weight calcium carbonate
.50 part by weight monocalcium acid phosphate It is to be understood, of course, that this basic formula may be varied considerably without seriously affecting its baking efficacy in the making of bread. The monocalcium phosphate, for example, may have a range of .1% by weight to 16% by weight. The calcium carbonate may vary from .5% by weight to 20% by weight. The potassium bromate cannot be varied too widely. For most soya flours it may be varied between .02% by weight to .2% by weight. A portion of the defatted soya flour may be replaced with an equal weight of ground whole soybeans. Ordinarily it is better not to replace more than 10% of the defatted soya flour with lipoxidase carrying material, which is derived by the cold grinding of whole soybeans. To this composition milk solids such as milk powder or the like may be added. Likewise sugar, such as sucrose or dextrose, may be added. The amount of milk powder and sugar which is added to our composition is proportioned so that the sugar and milk powder or either of these need not be added to the flour in the making of the dough. This will be clear to those skilled in the art.

A large number of experiments had to be made before we arrived at our composition. Just why the improved results are obtained is unknown. The discovery was made accidentally at first and proven by a large number of tests. We were seeking to avoid the deleterious effects of excess acids in milk powders and soya flours and used calcium carbonate and monocalcium acid phosphate as a buffer for these excess acids. When we used these along with the potassium bromate we obtained a loaf much whiter in crumb color, of equal volume to a milk control, of good grain and texture, of good keeping qualities and with no off-flavor. Bromate and calcium salts are common ingredients in yeast foods. By increasing the quantity of yeast food we should have obtained a better bread, but this did not happen. There may be an interaction between the ingredients in the composition prior to the actual incorporation in the dough. Whatever the reason, the fact remains that unexpected results are achieved with our composition, as will be pointed out more fully hereinafter.

In making our tests we used the so-called sponge-dough method. This method comprises taking 60% of the total flour and mixing it with sufficient water for a stiff dough. Then we add the yeast and the yeast food, mixing it with the dough at 76° F. The yeasted dough is then placed in a vat and permitted to ferment at 80° F. for four and a half hours. A relative humidity of about 80% is maintained during this process. This forms the "sponge." The sponge is then placed in a mixer, where the remaining 40% of the flour and the remainder of the water are added. About 2% of lard and 2% of salt are added at this time. 7% of sugar and 3% of milk powder are also admixed with the dough at this time. As will be pointed out hereinafter, if the milk powder and the sugar are in our composition they need not be added separately. After the ingredients are thoroughly mixed at a temperature of 80° F. they are permitted to stand for thirty minutes. This is usually called "floor time." The dough is then divided into rounded balls and permitted to "rest" for about twelve minutes. This period is called "overhead proof time." The balls are then molded into cylindrical shape and placed in baking pans, which are placed in a proofing cabinet and maintained at a relative humidity of 85% at a temperature of 102° F. In the proofing cabinet the rising of the bread is completed. This takes anywhere from fifty to seventy minutes. When the bread has risen the pans are placed in an oven and baked for a period of twenty to thirty minutes at a temperature of 425° F. to 525° F. The finished bread is then cooled for an hour and a half, sliced, wrapped, and is then ready for distribution.

In the examples given, the soya flour used was a 300 mesh fat extracted flour. In the composition referred to above the potassium bromate has an unexplainable effect in the combination. While it is a common ingredient in yeast foods it is not used as a yeast food in our composition since a yeast food has already been added in the making of the sponge. The yeast food which we add in the examples given is manufactured and sold under the trade-mark "Arkady." It has an average composition of 11.2% ammonium chloride, 30.8% calcium sulphate, .308% potassium bromate and 57.692% flour. The calcium carbonate in our composition is insoluble but neutralizes excess acids generated during fermentation as they occur. If the calcium carbonate is left out, the result is not obtained. The potassium bromate appears to be an oxidizing agent. If it is left out, the improved results are not obtained. The monocalcium acid phosphate acts as a buffer and the calcium ions seem to have some effect on the proteins present in the soya flour. If this is left out of the composition, the improved results are not obtained.

In the following examples the percentages are based on each one hundred pounds of flour. This is the method of designating ingredients in the baking industry.

*Example 1*

A sponge was made with the following ingredients:

| | Per cent |
|---|---|
| Southwest Patent Flour | 60 |
| Yeast | 2 |
| Yeast food | 0.5 |

A dough was made with the following ingredients:

| | Per cent |
|---|---|
| Southwest Patent Flour | 40 |
| Corn sugar | 6 |
| Salt | 2 |
| Lard | 2 |
| Our composition | 3 |

The dry sponge ingredients were placed in a Hobart mixer and about 35% water was added in which the yeast was admixed. The temperature of the mixer was adjusted to give a sponge temperature of 80° F. The mass was mixed for one minute at low speed and for two minutes at medium speed and then placed in a large pan in the fermentation cabinet and allowed to ferment for four and a half hours at a temperature between 84° F. and 86° F. and at a relative humidity of 85%. After the sponge had fermented it was returned to the mixer and mixed for one minute at low speed and seven minutes at high speed with the dough ingredients with enough water to give the flour the required absorption of 68%. By absorption we of course mean the number of pounds of water to each one hundred pounds of flour. After mixing, the dough mass was allowed to rest for a period of forty minutes. The dough was then divided into pieces weighing approximately eighteen ounces and molded. In the molding operation the dough piece was first rolled into a thin sheet about three-eighths of an inch thick. This sheet was then curled to form a roll about one and a half inches in diameter and about nine inches in length. The rolls of dough were then placed in baking pans measuring ten and a half inches by four inches at the top and ten inches by three and seven-eighths inches at the bottom, and three inches in depth. These pans were placed in a proofing cabinet and maintained at a temperature between 104° F. and 106° F. and at a relative humidity of 85% until the top of the dough was one-half inch above the top of the pan. This required fifty minutes. The raised dough was then baked for twenty-two minutes at 435° F. After baking, the bread was allowed to cool for one hour. At this time it had reached the temperature of 100° F. It was then wrapped in wax paper. The next morning the bread was scored for crust color, eveness of bake, symmetry, taste, aroma, grain, texture and loaf volume. The scoring was done by three persons with long experience in scoring bread. The average of the three scores for this loaf was 82.

*Example 2*

At the same time that the bread of Example 1 was being made, another batch of bread was made using precisely the same ingredients and processed in exactly the same manner, except that the 3% of our composition was replaced by 3% of defatted soya flour. In other words, soya flour alone was used instead of soya flour containing the calcium carbonate and the lesser amounts of potassium bromate and monocalcium phosphate. The scorers had no knowledge by which method the breads were made. The bread of Example 2 were loaves of smaller volume. In addition, there was a yellow crumb color and the score was 72.

*Example 3*

Doughs were made up by the method of Example 1, except that the yeast was increased to 4%, the lard to 8% and the sugar to 15%. Our baking composition was reduced to 2% in this mixture. This gave a "sweet" dough. The dough was divided into two-ounce pieces and baked into sweet rolls for fourteen minutes at 400° F. The sweet rolls were excellent from the standpoint of taste, aroma, texture and grain and were scored 80.

*Example 4*

A sweet dough was made exactly as in Example 3, except that our composition was replaced by defatted soya flour. The resulting rolls had a discoloration and weakening of the bread crumb, a more open grain and an off-"beanish" taste. These rolls were scored 70.

Our composition also had a very surprising effect in the making of rye breads. Whenever it is attempted to add milk products to rye breads the loaves are of a decidedly inferior quality, as will be pointed out more fully hereinafter. We are enabled to add milk powder to rye breads and still obtain an excellent rye bread with the use of our baking composition.

*Example 5*

The following sponge and dough ingredients were weighed in preparation of making rye bread:

Sponge:

| | Per cent |
|---|---|
| Clear spring wheat flour | 60 |
| Dark rye flour | 14.5 |
| Rye sour ferment | 8.5 |
| Yeast food | .5 |
| Barley malt | .14 |
| Lard | 2 |
| Bakers' yeast | 2 |

Dough:

| | Per cent |
|---|---|
| Clear flour | 27 |
| Yeast | .71 |
| Salt | 2 |
| Cerelose | 2.85 |
| Our composition | 2 |

The sponge was mixed as in Example 1, using 50% water in which the yeast was suspended, the sponge being allowed to ferment as in Example 1, after which the final dough was mixed and further treated as in Example 1. The resulting rye bread was far superior in volume, texture and general appearance to similarly prepared loaves in which 2% of milk powder was substituted for our composition made in precisely the same way and to loaves prepared without the use of either milk powder or our composition made in exactly the same way. The scores for the rye breads were as follows:

| | |
|---|---|
| Rye bread using our composition | 80 |
| Rye bread using milk powder instead of our composition | 60 |
| Rye bread without our composition or without milk powder | 70 |

We do not understand why we obtain this improvement in rye bread. It may be that the improvement is related to the buffering action of the calcium salts or is due to the combination between the calcium salts and the slight excess of bromate. We wish to emphasize, however, that the unexpected results are obtained and we have obtained them with repeated baking tests.

Our composition may be modified by the addition of dextrose to it in an amount equal to twice its weight. In this case no corn sugar will be added to the dough. Our composition may also be modified by the addition of varying amounts of milk powder equal to twice its weight or more. For an exceptionally rich bread, milk may be used instead of the water, and where a milk powder is used we achieve the effect of using milk instead of water.

It will be further understood that if desired, vitamin concentrates, such as vitamin A, vitamin D, riboflavin, thiamine, niacin, or pantothenic acid, may be added to provide a baking composition which may be used in the making of bread. Our composition has no deleterious effects upon the vitamin additives.

One thing to be borne in mind is that in mixing our composition care should be taken to see that this is done thoroughly in view of the minor amounts of the monocalcium phosphate and the potassium bromate, and particularly the latter, in the mixture. Care must be taken to disseminate this thoroughly if uniform results are to be obtained.

Besides improving the bread, as pointed out above, the buffer system inherent in our composition permits a fairly constant pH during fermentation and especially the fermentation during proofing. A dough which has acquired a pH of 5.0 or lower ages very rapidly, and thus considerably restricts the time of the operation. If, for example, a breakdown of equipment should occur or if the optimum length of time for fermentation should be misjudged, bread made without the use of our composition will not be the best which can be made with the particular flour used. However, a baker can be assured that the pH of the final dough will not be below 5.0. This is due to the insolubility of the calcium carbonate in the dough mixture. The baker can also be assured that the pH of the dough will not be above 6.0 to 6.5. In other words, our composition, besides having the unexpected results pointed out above, maintains a fairly constant pH during the final fermentation stages, and thus removes a major cause for erratic results. These erratic results, moreover, are in greater evidence when the bread is enriched by means of milk powders. This is due to the fact that the acidity of milk powders, in the absence of neutralizers, varies greatly. Our composition enables the use of a straight milk powder without the necessity of using neutralizers.

It will be seen that we have accomplished the objects of our invention. We have provided a composition for making bread in which soya flour may be added to the bread to increase the protein content without deleterious results, producing a bread having good crust, color, evenness of bake, symmetry of the loaf, good taste, aroma, grain, texture and loaf volume. We have provided a composition for making bread in which we may employ soya flour without producing creaminess of the bread crumb or a weakening thereof or a loaf of lowered volume having a beanish-like aroma and an off-beanish taste. We have provided a composition for making bread enabling us to use the soya flour and milk solids and giving a bread of high quality.

It will be understood that certain features and subcombinations are of utility and may be employed without reference to other features and subcombinations. This is contemplated by and is within the scope of our claims. It is further obvious that various changes may be made in details within the scope of our claims without departing from the spirit of our invention. It is therefore to be understood that our invention is not to be limited to the specific details shown and described.

Having thus described our invention, what we claim is:

1. A composition for making bread including in combination a major amount of defatted soya flour, from .1% by weight to 16% by weight of monocalcium acid phosphate, from .5% by weight to 20% by weight of calcium carbonate and from .02% by weight to .2% by weight of potassium bromate.

2. A composition for making bread including in combination 91 parts by weight of defatted soya flour, .07 parts by weight potassium bromate, 8.43 parts by weight of calcium carbonate and .50 parts by weight of monocalcium acid phosphate.

3. A method of making bread including the step of adding to the dough between 2% and 3% of the weight of the flour of a composition which comprises a major amount of defatted soya flour, from .1% by weight to 16% by weight of the composition of monocalcium acid phosphate, from .5% by weight to 20% by weight of the composition of calcium carbonate, and from .02% by weight to .2% by weight of the composition of potassium bromate.

ROLAND W. SELMAN, JR.
BOYCE G. CARSON.

References Cited in the file of this patent

UNITED STATES PATENTS

| Number | Name | Date |
|---|---|---|
| 1,497,477 | Blouch | June 10, 1924 |
| 1,936,636 | MacIntosh | Nov. 28, 1933 |
| 2,067,912 | Frey et al. | Jan. 19, 1937 |
| 2,530,056 | Handler | Nov. 14, 1950 |

FOREIGN PATENTS

| Number | Country | Date |
|---|---|---|
| 305,217 | Great Britain | of 1929 |
| 388,319 | Great Britain | of 1932 |